Figure 9:
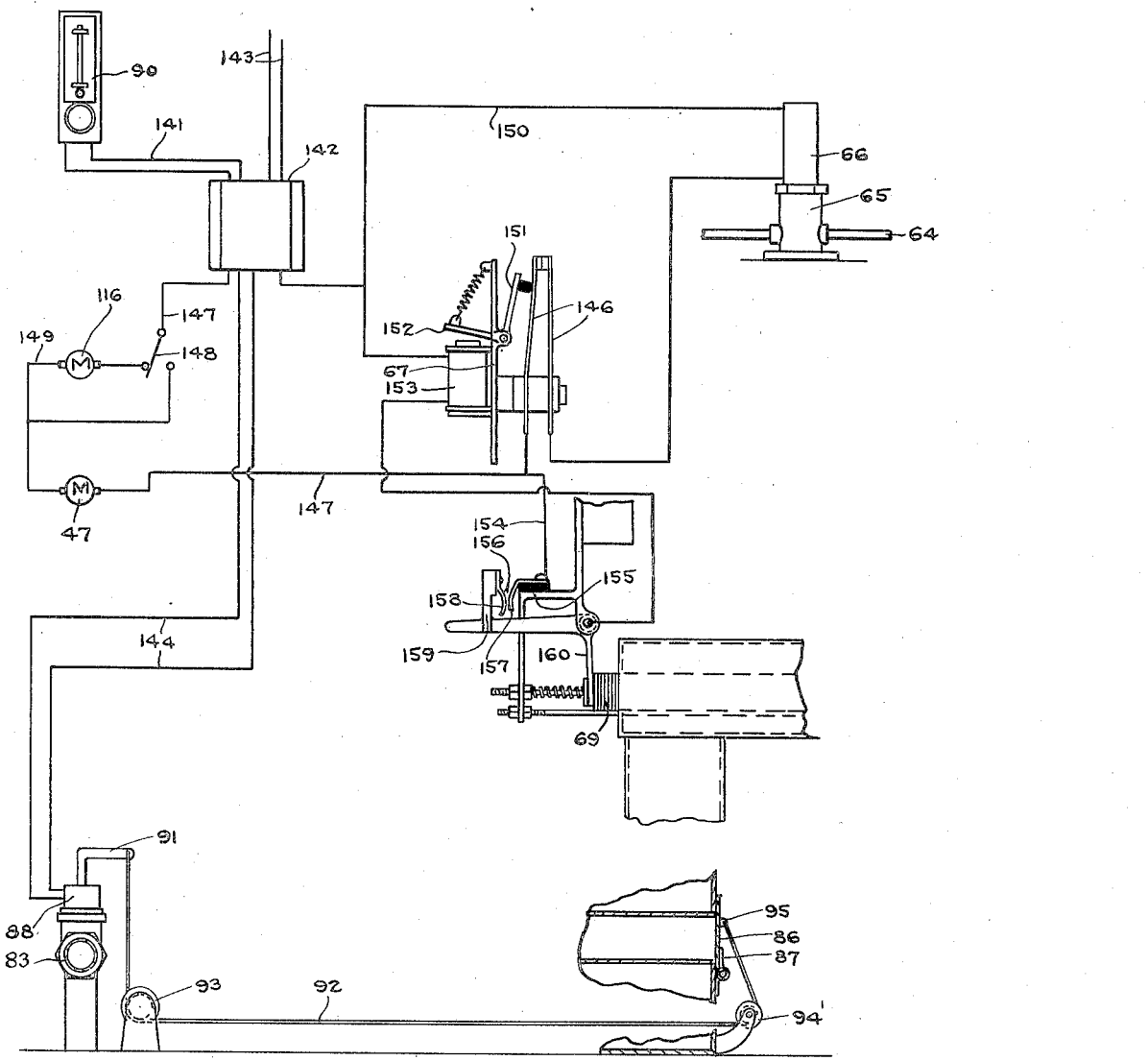

Dec. 3, 1935.  F. A. WHITELEY  2,022,835
HOT AIR FURNACE FOR HEATING HOMES
Original Filed June 26, 1931  4 Sheets-Sheet 1
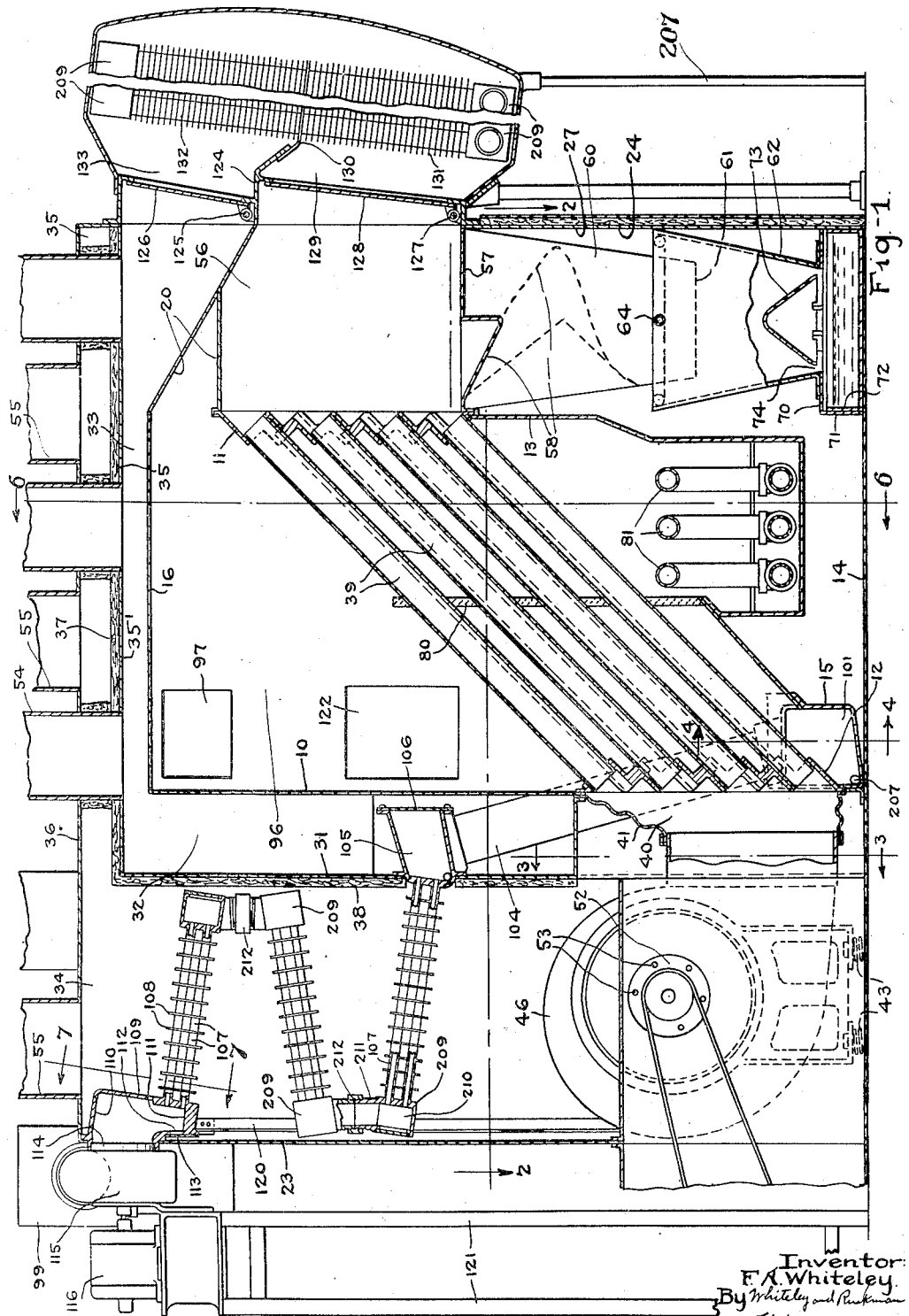

Dec. 3, 1935. F. A. WHITELEY 2,022,835
HOT AIR FURNACE FOR HEATING HOMES
Original Filed June 26, 1931 4 Sheets-Sheet 2
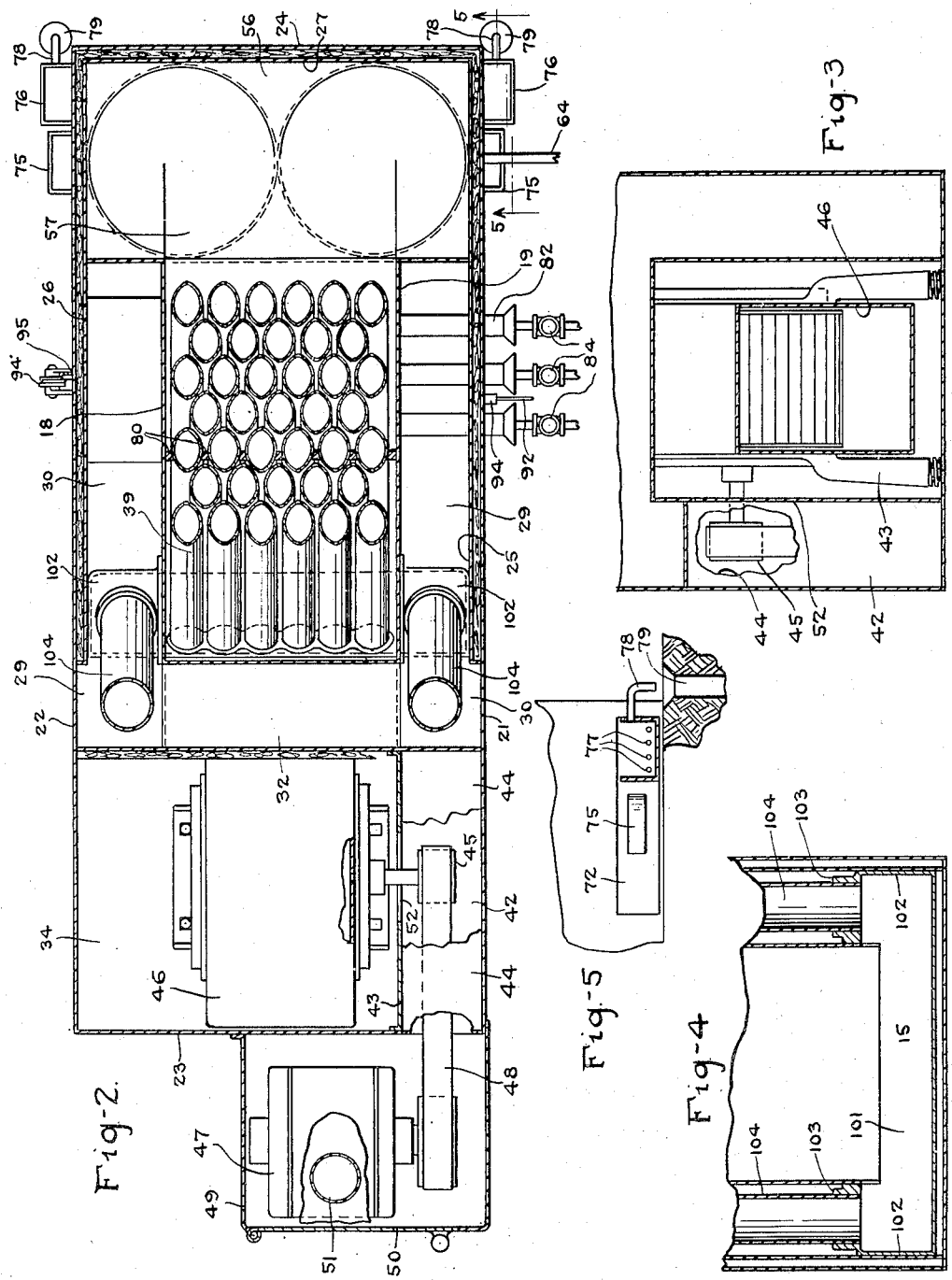
Inventor:
F. A. Whiteley
By Whiteley and Ruckman
Attorneys.

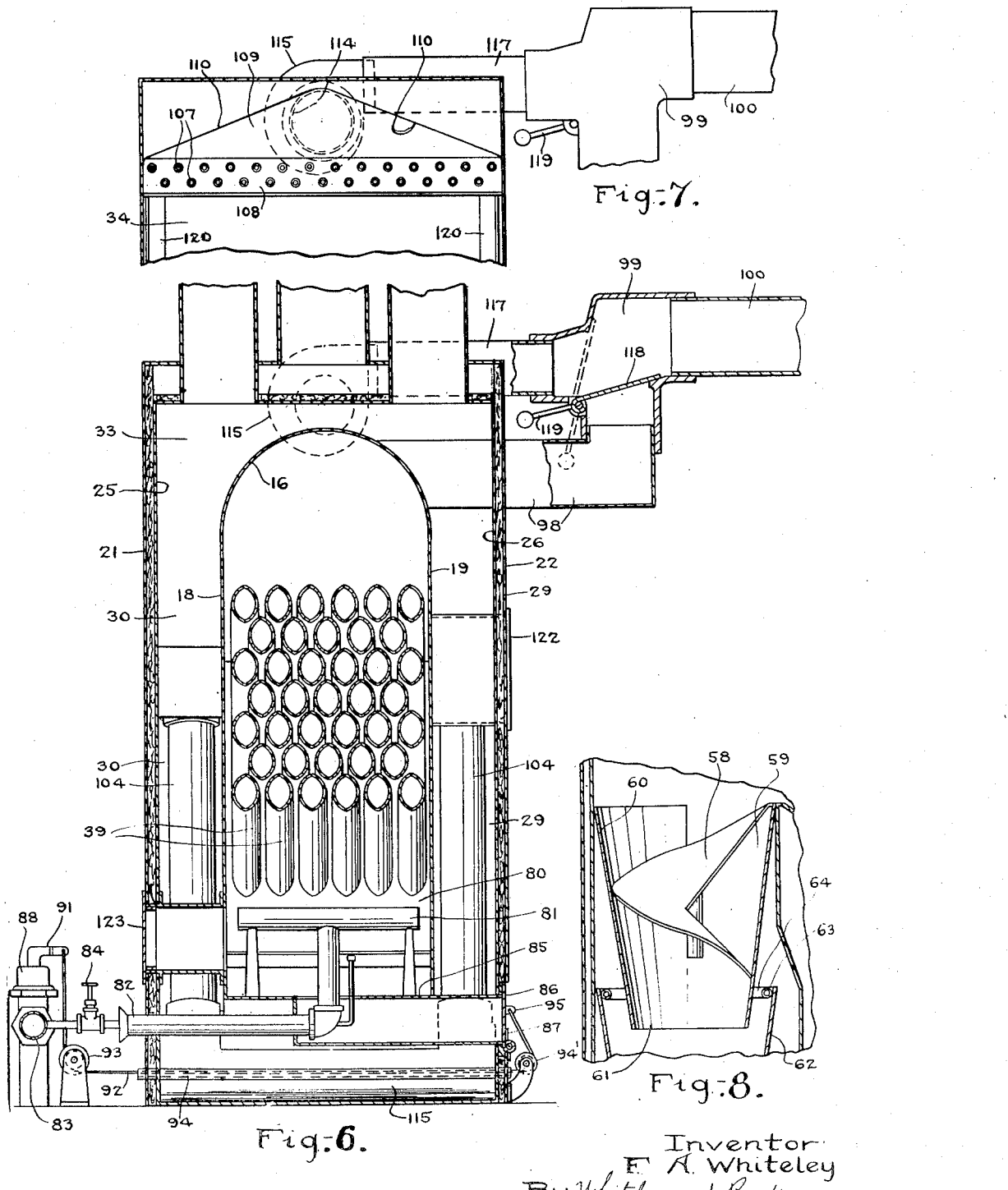

Patented Dec. 3, 1935

2,022,835

UNITED STATES PATENT OFFICE 2,022,835

HOT AIR FURNACE FOR HEATING HOMES

Frank A. Whiteley, Minneapolis, Minn.

Application June 26, 1931, Serial No. 547,164
Renewed April 24, 1935

11 Claims. (Cl. 126—116)

My invention relates to hot-air furnaces for heating homes and preferably using gas as a fuel. It is a principal object of my invention to provide a hot-air furnace of the type used in heating homes for employing gas as a fuel wherein the gases of combustion will be required to follow a long and tortuous path in contact with heat-exchanger surfaces, and wherein the air to be heated will be constrained also to follow a long and tortuous path contacting with said heat-exchanger surfaces, whereby the efficiency of the gas as a heating medium will be greatly increased and it will be within the means of householders to use gas as a fuel.

A further object of my invention is to provide in conjunction with the aforesaid means blowers for moving the air and for moving the gases of combustion respectively, both air and gases of combustion thus being positively moved through the system.

It is a further object of my invention to provide in connection with the air heating and moving means, particularly effective devices for simultaneously cleaning the dirt and dust carried by the air and moistening the same, said means embodying no filter elements but being open and unrestricted to the flow of the air.

It is a further object of my invention to employ a secondary heat exchanger comprising several layers of tubular finned members wherein the sheet metal fins are each integrally united with a multiplicity of tubes, said tubes discharging into headers at their respective ends and connecting several of said heat exchangers together so as to provide a multiplicity of layers of the same having substantially vertical passageways between the fins through which the air to be heated will be successively drawn and to provide means for moving the air successively down through these several relatively horizontal layers of heat exchanger members.

It is a further object of my invention to employ an electrically-operated gas valve for controlling the flow of gas to the burners embodying an external moving part and to supply secondary air to the gas burners through a gate removed from the gas valve with connections from said moving member to operate said gate so that it will be open only when the gas valve is open and the burner is in operation.

Other objects of my invention are to provide a casing with passages for controlling the passage of the air and with a system of gates whereby the air at will can be caused to pass through cooling devices for cooling the air for summer use; to thoroughly insulate the casing of the furnace by double walls and insulating material between the same; and to provide a structure which is particularly compact, easy to install and economical to build and which will have the heretofore-named features of efficient operation.

The full objects and advantages of my invention will appear in connection with the detailed description thereof, and its novel features are particularly pointed out in the claims.

In the drawings, illustrating the application of my invention,—

Fig. 1 is a sectional elevation view of the furnace taken longitudinally through the same. Fig. 2 is a sectional plan view on line 2—2 of Fig. 1. Fig. 3 is a sectional elevation view taken on line 3—3 of Fig. 1. Fig. 4 is a sectional elevation view taken on line 4—4 of Fig. 1. Fig. 5 is a detail sectional view taken on line 5—5 of Fig. 2. Fig. 6 is a sectional elevation view on the line 6—6 of Fig. 1. Fig. 7 is a transverse sectional view on line 7—7 of Fig. 1. Fig. 8 is a sectional elevation view of part of the air-moistener mechanism. Fig. 9 is a diagrammatic showing for the various controls for operating the furnace.

In the construction of my furnace a central fire chamber is formed by front end casing 10, casting heads 11 and 12, rear end casing 13, bottom casing 14 and bottom casting 15 and top 16 which is preferably formed continuous with side walls 18 and 19 domed as clearly shown in Fig. 2, and with an offset portion indicated at 20 in Fig. 1. The outside casing comprises side walls 21 and 22 and end walls 23 and 24. Adjacent the heat chamber inner side walls 25 and 26 are provided and adjacent the end wall 24 an inner wall 27 is provided, the spaces between these walls being filled with insulating material such as rock wool. Between the inner side walls 25 and 26 are vertical air legs 29 and 30, and a partition 31 between outer side walls 21 and 22 forms an end air leg 32, the air legs 29, 30 and 32, all discharging into an air-delivery chamber 33 above the domed fire chamber. Between the partitions 31 and 23 is an air-inlet chamber 34 which, as clearly shown in Fig. 1, is continued as indicated at 35 above the top of the air-delivery chamber 33 formed by a casing member 35' and below the top casing member 36, the top casing member 35' and end casing member 31 being insulated as indicated at 37 and 38.

Between the casting heads 11 and 12 extend a multiplicity of heat exchanger tubes 39 rising obliquely from points toward the bottom to points toward the top of the fire chamber, preferably as shown, at an angle of 45 degrees. The lower ends of said tubes open into a chamber 40 formed with flexible connector walls 41 which connect with the blower 46 of usual construction mounted upon spring supports 43 in the lower part of the air-intake chamber 34. As clearly shown in Figs. 2 and 3, the lower part of said air-intake chamber 34 is formed with a separated chamber 42 by means of a vertical wall 43 and a top wall 44, and in this compartment or chamber 42 is located the drive pulley 45 of a blower 46 of usual construction. A motor 47 is located outside of the end casing member 23 and is connected by a belt 48 with the pulley 45, the casing 23 being cut away adjacent the end of chamber 42 for that purpose. A housing 49 adapted to be opened by a rear door 50 overlies the motor 48, and a fresh-air duct 51 leads to the interior of said housing and runs to outdoor atmosphere at its other end. An opening 52 leads through the single wall 43 of chamber 42 to the air-inlet chamber 34 and small openings 53 pass through the casing of the blower adjacent the main bearing thereof. In this way a certain amount of fresh air is delivered to the apparatus which passes over the motor and over the main bearing of the blower, thus keeping these parts cool in addition to adding fresh air to that being delivered from the heater.

The heated air is delivered through the rooms from the hot-air delivery chamber 33 by means of a suitable number of pipes 54, and the air is returned from the rooms being heated to the air-intake chamber or its overlying extension 35 by means of air return pipes 55. This air passes through heat exchangers hereinafter described in the air-inlet chamber, and then through the blower, and from there through the tubes 39 into an air-transfer chamber 56 which extends all the way across between inner side walls 25 and 26, as clearly shown in Fig. 2. The air-transfer chamber 56 has a bottom wall 57 in which are two depressed spiral portions 58, as best shown in Figs. 1 and 8. These spiral portions lead to a delivery aperture 59 of roughly triangular section, as shown in Fig. 9, and so positioned in relation to the spiral flooring member 58 as to cause the air to be driven against the converging walls of a conical member 60, whereby the air is put into violent whirling motion, discharging from the narrowed lower end 61 of said member into the interior of a second conical member 62 whose upper edge is surrounded by a water pipe 63 and spaced from the outside of member 60, as indicated at 64, through which space the air discharges against partition 13 and under bottom wall 14 to be delivered through side legs 29 and 30 and end leg 32 to the air-delivery chamber 33. The water pipes 63 in the respective bottom cone member 62 connect with a supply water pipe 64 leading to a source of pressure such as the mains of the water supply system of any city or town. Water is delivered to said pipes through a spring closing valve 65, which by the operation of the spring is normally closed and out of operation. A solenoid 66 in circuit with the same electric circuit which operates the motor 47 when energized lifts the valve and admits water to the circular pipes in the cone member 63, water being thus supplied only when the motor and the blower 46 driven by it is in operation. This results in placing a film of water upon the inside of the whirling cone member 62 which is impinged by the whirling currents of heated air. This has the double effect of throwing out of said currents dust and dirt which are caught by the film of water or which otherwise will gravitate to the bottom of cone member 62 and of delivering to the heated air moisture from the wet surface on the inside of cone member 62. A circuit breaker 67 located in the circuit 150 which operates the solenoid is controlled by a humidostat 69 so that when the moisture content of the air of the rooms being heated rises to a predetermined degree that will cause the humidostat to operate the circuit breaker and switch off current from the solenoid, whereupon the spring valve will shut off water flow and no more water will be delivered to the cone member 62. This arrangement thus provides that water flows to the inner walls of moistener member 62 only when the blower is in operation and air being driven and delivered to the rooms of the building. And, furthermore, delivery of water will be cut off entirely when the humidity of the air is at a desired degree, thus making the humidifier entirely automatic. As shown in Fig. 1, the cone member 62 seats at its lower end in airtight relation upon a top member 70 of a boxing 71 which opens through the side of the heating device to admit a water-pan drawer 72 entirely open at the top. Within the member 62 is a cone member 73 held loosely positioned so that it may be pushed up into the interior of the member 62 for cleaning the inside walls thereof. Between the bottom edges of the cone member 73 and of the member 62, respectively, is an annular passageway 74 which admits of dust and dirt and surplus water passing downwardly into the boxing 71 and the pan 72. Each of the pans 72 has attached thereto handles 75 by means of which they may be withdrawn from the boxing 71; and the pans have an external chamber portion 76 connecting through small apertures 77 with the interior of said pans at points a little removed from the bottoms thereof. A discharge tube 78 from the extended portion 76 overlies any suitable receiving mouth 79 leading to the sewer. By these means surplus water will be eliminated from the system without permitting outflow of air, and the pans can readily be withdrawn from time to time and carried to a sink for washing out accumulations of dirt deposited from the air cleaner.

Extending upwardly from the bottom partition 14 within the fire chamber is a partition 80 which separates the air tubes 39 into two sections, and which terminates at the top of said tubes, as shown in Fig. 1. Located within the space formed by the partition 80 and the rear partition 13 and below the upper portions of the obliquely-disposed tubes 39 are a series of fluid fuel burners 81, as shown, connected for the burning of gas. The burners 81 are connected with air and gas feed tubes 82 of ordinary construction, the gas running to a manifold 83 and each burner having a shut-off valve 84. Secondary air is admitted beneath the burners from a duct 85 leading to the outside of the furnace on the opposite side from the gas manifold 83 and normally closed by a valve gate or door 86 held shut by spring members 87. An electrically-operated gas valve 88 supplies gas to the burners when the motor 89 is energized to switch on the current by the thermostat 90. In connection with the gas valve 88 there is an arm 91 which is caused to rise whenever the gas valve header is actuated to open the gas valve. A flexible member 92 (preferably metal cord or chain) runs around a pulley 93 and through a pipe or tube 94, passing through the lower part of the air chamber and sealed into the side walls thereof, and said cord passes around another pulley 94' on the opposite side of the furnace and connects at 85 with the secondary air gate 86. It follows that when the gas valve 88 is actuated to turn on gas the arm-piece 91 rises and pulls up the flexible member 92, which in turn pulls down the door 86, thus opening the secondary air valve. The gases of combustion are constrained by the wall 80 to rise through the upper ends of the pipes 39 into the upper portion 96 of the fire chamber, from which they may, under normal conditions, escape through duct 97 and pipe 98 to a valve box 99 which through smoke pipe 100 discharges to the stack. This is the safety exit of the gases designed to operate when the means hereinafter described for drawing off the gases of combustion by forced draft are not in operation. These means are as follows:

The casting member 15 at the bottom of the heat chamber extends across the same as shown in Fig. 6. This member is an open trough along its length across the fire chamber and below the tubes 39 but is sealed into the side walls 18 and 19 of the fire chamber with openings 101 leading into box-like extensions 102 at each end thereof, as shown in Figs. 1 and 4. From the box extensions 102 there are nipples 103 in which are seated tubes 104 discharging into the ends of a transverse casting member 105, which member has its face closed by a removable plate 106. The tubes 104 extend upwardly in the side air legs 29 and 30, as clearly shown in Fig. 6, coming forward into the front air leg 32, as shown in Fig. 1; and the casting member extends for the full width of the front air leg 32. Making airtight connection with the air casting 105 are a multiplicity of tubes 107 as shown in Fig. 1, each of said tubes being integrally connected with transverse fin plates 108, the tubes in turn being connected with headers 209 forming internal chambers 210 and with connector portions 211 secured by union nuts 212. A multiplicity of these heat exchanger members are thus connected together (as shown in Fig. 1 there are three such members), all extending downwardly at a slight angle so that moisture which condenses will progressively drain down and through the tubes 104 into the lower casting box and out of the system through the drain 207. The tubes 107 connect with a casting member 109 which extends entirely across the air-inlet chamber 34 and which has sloping top walls 110, as clearly shown in Fig. 7. The tube entrances are flush with the sloping bottom walls 111 of the member 109, so that condensate will drain from the bottom of said member into said tubes. The casting 109 is provided with a bottom opening 112 closed by a plate 113 which may be removable. The casting 109 discharges through a central orifice 114 to a blower 115 operated by a motor 116 which is on a common circuit with the main blower motor 47, so that both motors are operated simultaneously. Blower 115 discharges through a pipe 117 into the smoke box 99. In the smoke box 99 is a valve closure 118 which is normally held in dotted-line position by a weighted arm 119. As shown, the dotted-line position is immediately in front of the discharge of pipe 117, so that when the blower 115 is in operation the blast moved by it will impinge upon the valve member 118 and move it from the dotted-line to the full-line position, thus closing communication through duct 10 leading directly from the fire chamber and causing the gases of combustion to move from the top of the fire chamber back through the lower portions of air tubes 39 into casting 15 through the openings 101 at the ends thereof, through pipes 104 into casting 105, thence through tubes 107 into the casting member 109 and from there through the blower to the stack. Supports 120 hold up casting member 109 and supports 121 hold up the motor 116 and blower 115. Other supports (not shown) hold up casting member 105, all said supports being preferably of angle iron arranged in a well-known way. An upper door 122 and lower door 123 lead to upper and lower portions of the fire chamber respectively for access for cleaning and inspection.

The rear end of the air-transfer chamber 56 and the rear end of the air-delivery chamber 33 have applied thereto a casting 124 which closes the end of the casing, said casting having hinged at 125 a door 126 for closing the heat-delivery chamber 33, and at 127 a door 128 for closing the opening into the air-transfer chamber. These doors in the position shown in Fig. 1 when in their erected position are somewhat overbalanced from the vertical so that with the air-pressure from within they will normally be held in their closed position. However, when desired door 128 can be swung down so as to open transfer chamber 56 to a passageway 129, which leads beneath a partition 130 into a multiplicity of slightly oblique passageways 131 in heat exchanger members in all respects similar to those heretofore described as being used in the air-intake chamber, these heat-exchanger members being provided with headers 209 between which extend tubes 132 similar to the tubes 107 in the first-named heat-exchanger members and which tubes extend through the division wall 130 and across a chamber to which a passageway 133 opens through door 126 to the air-delivery chamber.

The heat exchangers in the air-cooling chamber just referred to and in the air-intake chamber are of the type shown and described in my co-pending application for Heat exchangers and methods of making the same, Serial Number 545,940, filed June 22, 1931. And the entire cooling unit there shown and claimed is the same as the cooling unit here shown except that in this application the cooling unit is shown attached to the hot-air furnace so that by swinging down the doors 128 and 126 and putting in operation the heat-exchanger means in the cooling chamber the furnace may be turned into a device for cooling rooms employing the same delivery and return system and the same means for moving the air.

As diagrammatically shown in Fig. 9, the control instrumentalities include a thermostat 90 in the rooms to be heated connected by wiring 141 with a motor-operated switch mechanism 142 of well-known construction which in turn connects with the power lines 143. From the switchbox one circuit 144 goes to the gas valve motor 88 and another circuit 147 goes to a manually-operated switch 148 to the air blower motor 47. The switch 148 controls a shunt line 149 going to the smoke blower motor 116. When the device is used as a heating device the switch is operated to throw the smoke blower motor in series with the air-blower motor. When it is used as an air-cooling device the smoke blower motor is thrown out of the circuit. The circuit 147 goes through contact fingers 146 of the circuit breaker 67 to and through solenoid 66 for operating the water valve 65 and back through wiring 150 to the switch-operating box 142. The circuit breaker is normally held closed by a spring-actuated arm 151 controlled by an armature 152 of a solenoid 153 which is on a shunt circuit 154 going through the solenoid 153 and which circuit is broken at 155 by a suitable insulator and a gap 156 between circuit-closing members 157 adjacent the insulation 155 and 158 on a rock arm 159 which has the short arm 160 thereof engaged by the end of humidostat 69. As moisture enters the air the humidostat swells and tends to have its end move in a direction to rock the arm 159 so as to bring the circuit-closing members 158 and 159 in contact. When that occurs current passes through circuit 154 and solenoid 153 and causes armature 152 to rock the arm 151 and permit the circuit-breaker members 146 to separate, thus shutting off current to the solenoid 66 and terminating supply of water. Also, as clearly shown, the upward movement of valve arm 91 will operate to open the secondary air valve 86.

The advantages of my invention have been set forth hereinbefore quite clearly. In its entirety it provides simple and efficient means for heating the air in the colder weather and at the same time cleaning and moistening it, which when desired for cooling may be readily transferred into cooling means which will also simultaneously remove moisture and dirt. The whole system can be built economically, made extremely durable and thoroughly automatic, it being understood that the thermostat may be set to operate in reverse direction in warm weather when cooling is desired to what it does in cold weather when heating is desired.

I claim:

1. A hot air furnace, comprising a vertically-extended fire-chamber, a multiplicity of air-conveying tubes extending obliquely across said chamber from points toward the bottom to points toward the top thereof, a fluid fuel burner in said chamber under the upper portions of said tubes, means for discharging the gases of combustion from below the lower portion of said tubes, and a casing wall under said burner and extending vertically about the central portions of said tubes to the top plane thereof.

2. A hot air furnace, comprising a vertically-extended fire-chamber, a multiplicity of air-conveying tubes extending obliquely across said chamber from points toward the bottom to points toward the top thereof, a fluid fuel burner in said chamber under the upper portions of said tubes, means for discharging the gases of combustion from below the lower portions of said tubes, said discharging means including a multiplicity of small tubes, and means for moving the air to be heated about said last-named tubes and through said first-named tubes.

3. A hot air furnace, comprising a vertically-extended fire-chamber, a multiplicity of air-conveying tubes extending obliquely across said chamber from points toward the bottom to points toward the top thereof, a fluid fuel burner in said chamber under the upper portions of said tubes, means for discharging the gases of combustion from below the lower portions of said tubes, said discharging means including a multiplicity of small tubes extending in a substantially horizontal plane to form a layer of substantially the width of the fire-chamber, and means for moving the air to be heated through said horizontal layer and about the tubes forming it and through the first-named tubes.

4. A hot air furnace, comprising a vertically-extended fire-chamber, a multiplicity of air-conveying tubes extending obliquely across said chamber from points toward the bottom to points toward the top thereof, a fluid fuel burner in said chamber under the upper portions of said tubes, means for discharging the gases of combustion from below the lower portions of said tubes, said discharging means including a multiplicity of small tubes bent to form a plurality of substantially horizontal runs lying in common planes so as to form a plurality of layers of said tubes of substantially the width of the fire-chamber, and means for moving the air to be heated about all said runs and through all said horizontal layers and through the first-named tubes.

5. A hot air furnace, comprising a casing forming a heat chamber and air-heating passages about said heat chamber and including an air-intake chamber, a fluid fuel burner toward the bottom of said heat chamber, means for conducting combustion gases from the bottom of said heat chamber at the sides and adjacent to said fluid fuel burner, heat exchanger means in said air-intake chamber for conducting the combustion gases from the heat chamber to the stack, and means to move the air to be heated through the intake chamber and over said heat exchanger means and to said passages.

6. A hot air furnace, comprising a vertical passageway, means for causing air to move to and through said passageway, means for heating air before it reaches the passageway, a conical member forming part of the walls of said passageway and a connection thereto for causing the air to whirl therein, a second conical member receiving the whirling air from the first conical member and discharging it over the edge thereof, and means for producing a film of water on the inner walls of the second conical member whereby the heated air is simultaneously moistened and cleaned.

7. A hot air furnace, comprising a fire-chamber, heat-exchanger tubes connected therewith and having connection with the stack for carrying off the gases of combustion, part of the travel of said gases being downward, a blower for moving said gases of combustion therethrough, a gas burner in said fire-chamber, a normally-closed valve for supplying gas to the burner, a normally closed valve for supplying secondary air to the burner, a motor for opening said first-named valve, and connections between the two valves whereby the operation of the gas valve will open the secondary air valve.

8. A hot air furnace, comprising a casing forming a fire-chamber, heat-exchanger tubes connected therewith and having connection with the stack for carrying off the gases of combustion, part of the travel of said gases being downward, a blower for moving said gases of combustion therethrough, a gas burner in said fire-chamber, a normally-closed valve for supplying gas to the burner on one side of the furnace, a normally-closed valve for supplying secondary air to the burner on the other side of the furnace, a motor for operating said first-named valve including an external moving member, a pipe extending across the furnace casing and sealed from the interior thereof, and a flexible member connected with said movable member and extending through the pipe whereby the movable member will cause the secondary air valve to open whenever the gas valve is operated to open.

9. A hot air furnace, comprising a fire chamber and an air-inlet chamber, means for discharging gases of combustion from the fire chamber including a plurality of heat exchanger units in the air-inlet chamber each unit consisting of a multiplicity of thin plates and a multiplicity of small tubes extending therethrough and integrally united with said plates, means connecting the several units together in spaced relation so that they form successive layers of heat exchanger surfaces, a blower connected with the last of said units for moving the gases of combustion through the tubes of all the units and discharging said gases to the stack, and a second blower for moving the air to be heated through all said heat exchanger layers.

10. An air conditioner comprising a casing consisting of metallic walls and partitions interconnected to form a heat chamber and air passageways for carrying air about the heat chamber, means for moving the air through said passageways under pressure, a combined air cleaner and air moistener formed in conjunction with and as part of said passageways for acting upon the air after it is heated and while it is moved comprising a cylinder, means in the cylinder for causing the air to whirl, means for maintaining a water surface to be impinged by the whirling air, a hydrostatic member subject only to air of the rooms being conditioned, and means controlled by the hydrostatic member for controlling said water surface.

11. An air-conditioner comprising a casing consisting of metallic walls and partitions interconnected to form a vertically-elongated internally-open heat chamber and primary heat exchanger with air-conditioning passages about the same, a multiplicity of tubular air-conditioning passages extending obliquely across said chamber from points toward the bottom to points toward the top thereof, an air-intake chamber separate from and at one side of said heat chamber opening into the lower portion of said oblique tubes, means for moving air through said air-intake chamber and through all said tubes, a fluid fuel burner located in the bottom of said heat chamber under the upper portions of said tubes for generating combustion gases and directing them to pass upwardly about all said tubes and into the upper portion of said chamber, means for discharging the gases of combustion from the heat chamber at points below the lower portions of said tubes, and a secondary heat exchanger system in said air-intake chamber for conducting said discharged combustion gases along a tortuous and extended path from the heat chamber to the stack.

FRANK A. WHITELEY.